United States Patent
Christmann et al.

(10) Patent No.: US 9,995,312 B2
(45) Date of Patent: Jun. 12, 2018

(54) EXHAUST-GAS TURBOCHARGER

(71) Applicant: BorgWarner Inc., Auburn Hills, MI (US)

(72) Inventors: Ralf Christmann, Kaiserslautern (DE); Bjoern Bergner, Kirchheimbolanden (DE)

(73) Assignee: BorgWarner Inc., Auburn Hills, MI (US)

( * ) Notice: Subject to any disclaimer, the term of this patent is extended or adjusted under 35 U.S.C. 154(b) by 325 days.

(21) Appl. No.: 14/648,058

(22) PCT Filed: Nov. 21, 2013

(86) PCT No.: PCT/US2013/071173
§ 371 (c)(1),
(2) Date: May 28, 2015

(87) PCT Pub. No.: WO2014/088822
PCT Pub. Date: Jun. 12, 2014

(65) Prior Publication Data
US 2015/0308448 A1    Oct. 29, 2015

(30) Foreign Application Priority Data

Dec. 6, 2012 (DE) .......................... 10 2012 024 009

(51) Int. Cl.
*F02D 23/00* (2006.01)
*F04D 29/28* (2006.01)
(Continued)

(52) U.S. Cl.
CPC ........... *F04D 29/284* (2013.01); *F01D 17/12* (2013.01); *F02B 37/00* (2013.01); *F02B 37/186* (2013.01);
(Continued)

(58) Field of Classification Search
CPC ...... F04D 29/284; F04D 17/00; F04D 29/043; F02B 37/00; F02B 37/186; F02B 37/18;
(Continued)

(56) References Cited

U.S. PATENT DOCUMENTS 2,453,650 A * 11/1948 Alexanderson ........... F02D 9/00
91/367
2,978,823 A *  4/1961 Wiklund .............. G03B 23/048
353/116
(Continued)

FOREIGN PATENT DOCUMENTS

DE         2253953 A *  4/1974 ............... F16D 3/78
DE   102007018618 A1 * 10/2007 .............. F02B 37/18
(Continued)

OTHER PUBLICATIONS

A certified translation of Stilgenbauer et al. (Pub. No. DE 10 2007 048 618 A1), published on Oct. 25, 2007.*
(Continued)

*Primary Examiner* — Thai Ba Trieu
(74) *Attorney, Agent, or Firm* — Eric L. Doyle; Stephan A. Pendorf; Patent Central LLC

(57) ABSTRACT

An exhaust-gas turbocharger (1) having a turbine (2) which has a turbine housing (3) and which has an exhaust-gas control device (4, 5) arranged in the turbine housing (2); and having an actuator (12; 12') which is operatively connected to the exhaust-gas control device (4, 5) via a drive train (6), with at least one damping connecting element (8; $8^I$; $8^{II}$; $8^{III}$; $8^{IV}$; $8^V$; $8^{VI}$) arranged in the drive train (6).

9 Claims, 4 Drawing Sheets

(51) Int. Cl.
*F02B 37/18* (2006.01)
*F01D 17/12* (2006.01)
*F02B 37/00* (2006.01)
*F04D 17/00* (2006.01)
*F04D 29/40* (2006.01)
*F16D 3/68* (2006.01)

(52) U.S. Cl.
CPC ........... *F04D 17/00* (2013.01); *F04D 29/403* (2013.01); *F05D 2220/40* (2013.01); *F16D 3/68* (2013.01); *Y02T 10/144* (2013.01)

(58) Field of Classification Search
CPC ........ F01D 17/12; F05D 2220/40; F16D 3/68; Y02T 10/144
USPC ............ 60/602; 415/144–145; 464/179–180, 464/68.3; 417/540; 91/367
See application file for complete search history.

(56) References Cited

U.S. PATENT DOCUMENTS

| | | | | |
|---|---|---|---|---|
| 3,500,659 A | * | 3/1970 | Martin | F16D 3/78 464/93 |
| 3,537,275 A | * | 11/1970 | Smith | F16D 3/74 464/88 |
| 4,251,050 A | * | 2/1981 | McInerney | F02B 37/186 60/602 |
| 4,257,242 A | * | 3/1981 | Domer | F16D 3/68 464/76 |
| 5,150,629 A | * | 9/1992 | Morris | F16H 61/32 74/335 |
| 5,251,503 A | * | 10/1993 | Morris | F16H 61/32 74/335 |
| 5,385,218 A | * | 1/1995 | Migliori | F15B 15/065 91/23 |
| 6,361,443 B1 | * | 3/2002 | Walter | F16D 3/50 464/87 |
| 9,506,398 B2 | * | 11/2016 | Dusik | F02B 37/186 60/602 |
| 2005/0198956 A1 | | 9/2005 | Fremerey et al. | |
| 2007/0271917 A1 | | 11/2007 | Vogt | |
| 2010/0011764 A1 | * | 1/2010 | Andrews | F02B 37/186 60/602 |
| 2011/0005222 A1 | * | 1/2011 | Hayashi | F02B 37/183 60/602 |
| 2011/0049400 A1 | * | 3/2011 | ter Horst | F16K 31/1635 251/25 |
| 2012/0279217 A1 | | 11/2012 | Eriksson | |
| 2014/0345273 A1 | * | 11/2014 | Yamaguchi | F02B 37/186 60/602 |

FOREIGN PATENT DOCUMENTS

| | | | | |
|---|---|---|---|---|
| DE | 202011101119 U1 | * | 7/2011 | ............ F02B 37/186 |
| DE | 102010023050 A1 | | 12/2011 | |
| DE | 102012202248 A1 | * | 8/2013 | ............ F16H 57/028 |
| DE | 102012204497 A1 | * | 9/2013 | ............ F02B 37/186 |
| FR | 2446959 A | * | 9/1980 | |
| JP | 2006009849 A | * | 1/2006 | |
| JP | 2011220240 A | | 11/2011 | |
| JP | 2015094283 A | * | 5/2015 | .............. F02B 37/18 |
| KR | 100639513 B1 | * | 10/2006 | .............. F02B 37/18 |
| KR | 2013059043 A | * | 6/2013 | |
| WO | WO 2013165719 A1 | * | 11/2013 | .............. F02B 37/18 |

OTHER PUBLICATIONS

International Search Report in International Application No. PCT/US2013/071173, dated Mar. 4, 2014.

* cited by examiner

EXHAUST-GAS TURBOCHARGER

BACKGROUND OF THE INVENTION

Field of the Invention

The invention relates to an exhaust-gas turbocharger with a turbine which has a turbine housing and an exhaust-gas control device arranged in the turbine housing; and an actuator which is operatively connected to the exhaust-gas control device via a drive train.

Description of the Related Art

A generic exhaust-gas turbocharger may be provided with an exhaust-gas control device which may be in the form of a wastegate flap arrangement and/or in the form of a so-called variable turbine geometry. Both arrangements are arranged in the turbine housing and influence and/or control the exhaust-gas flow. In the case of the wastegate flap, there is a bypass that is opened by means of the wastegate flap when a predeterminable pressure level is reached. With the variable turbine geometry, the exhaust-gas flow that is conducted to the turbine wheel blades can be conducted through exhaust-gas ducts whose flow cross sections can be increased and decreased in size.

For the actuation of the above-described exhaust-gas control device, the generic exhaust-gas turbocharger has an actuator. Here, an actuator may be a pneumatically actuated control capsule or a so-called electric actuator. In both cases, the actuator is connected via a drive train to the respectively provided exhaust-gas control device, in order that the latter can be actuated by the actuator.

Here, gas pulsations in the drive train between the actuator and the exhaust-gas control device can lead to high levels of wear during operation.

BRIEF SUMMARY OF THE INVENTION

It is therefore an object of the present invention to provide an exhaust-gas turbocharger, the wear behavior of which can be improved in relation to the prior art.

Accordingly, it is provided according to the invention that a vibration damping element is arranged in the drive train between the actuator and the exhaust-gas control device.

BRIEF DESCRIPTION OF THE SEVERAL VIEWS OF THE DRAWINGS

Further details, advantages and features of the present invention will emerge from the following description of exemplary embodiments with reference to the drawing, in which.

DETAILED DESCRIPTION OF THE INVENTION

Figure 1:
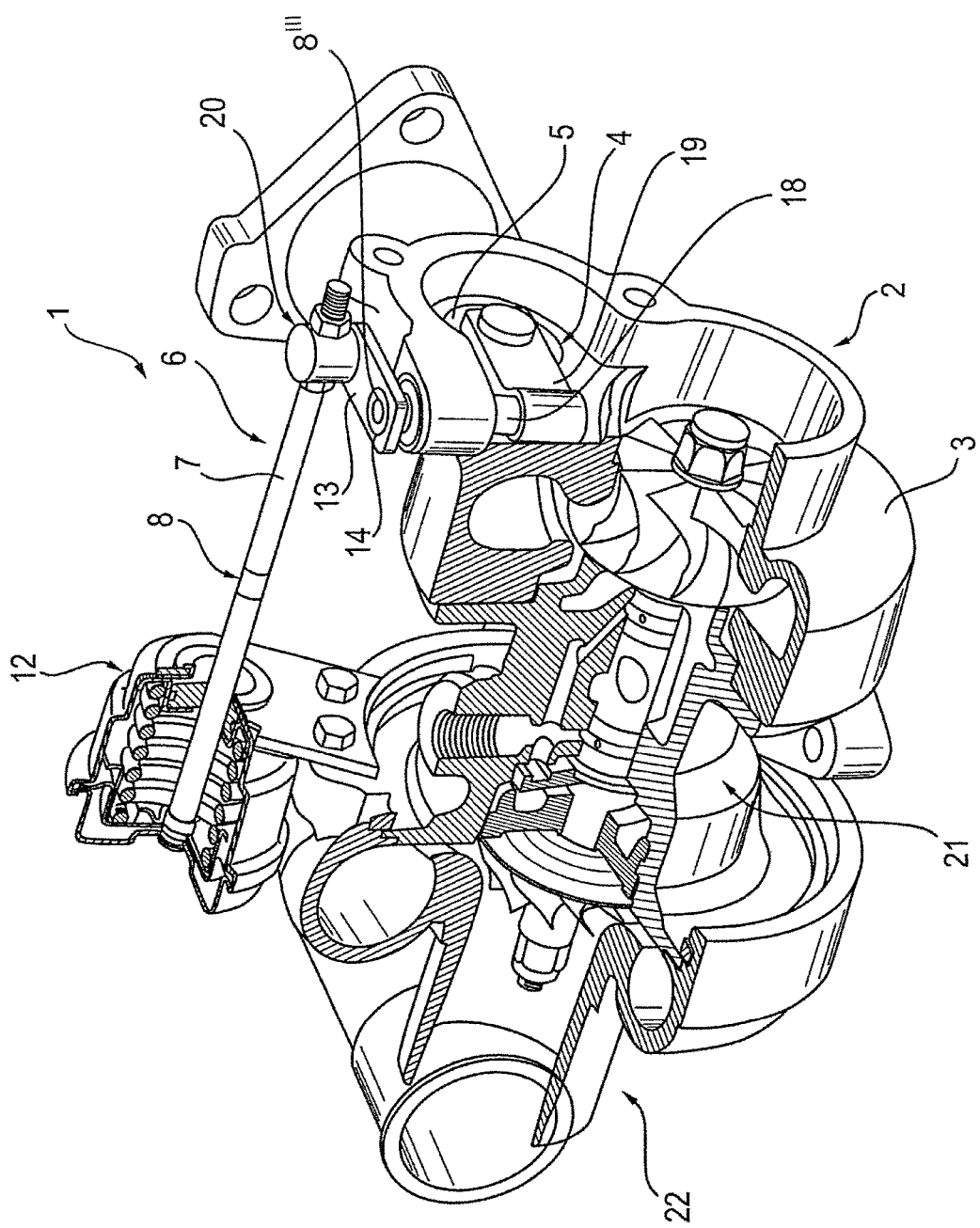
FIG. 1 is a perspective sectional illustration of an exhaust-gas turbocharger according to the invention which is provided with an actuator in the form of a pneumatic control capsule.

An exhaust-gas turbocharger 1 according to the invention is illustrated in FIG. 1. The exhaust-gas turbocharger 1 has a turbine 2 that is provided with a turbine housing 3. Furthermore, the exhaust-gas turbocharger 1 has a bearing housing 21 and has a compressor 22 that is connected via the bearing housing 21 to the turbine 2. The exhaust-gas turbocharger 1 self-evidently also has all the other conventional parts of an exhaust-gas turbocharger of said type, such as the turbine wheel, the shaft and the compressor wheel, the wheels both being arranged on the shaft. Although the parts are illustrated in FIG. 1, they will not be described in detail below because they are not required for the explanation of the principles according to the invention.

As shown in FIG. 1, the exhaust-gas turbocharger 1 also has an exhaust-gas control device which, in the example, is in the form of a wastegate flap 4 with a flap plate 5. The exhaust-gas control device 4 is actuated by means of an actuator 12. For this purpose, the actuator 12, which as explained above is in the form of a pneumatic control capsule in the embodiment as per FIG. 1, is connected to the exhaust-gas control device 4 via a drive train 6. In the embodiment illustrated in FIG. 1, the drive train 6 has a regulating rod 7 which can be adjusted in a translatory movement by means of the actuator 12. At its free end, the regulating rod 7 is connected via a connecting piece 20 to an external drive lever 13. The drive lever 13 is connected to a flap shaft 18 to which there is attached an internal flap shaft lever 19 to which the flap plate 5 is fastened. In the illustrated example of FIG. 1, the drive train 6 accordingly has the regulating rod 7, the connecting piece 20, the external drive lever 13, the flap shaft 18 and the internal flap shaft lever 19, via which parts the actuator 12 is connected to the wastegate flap or the flap plate 5 thereof.

As shown in FIG. 1, the exhaust-gas turbocharger 1 also has an exhaust-gas control device which, in the example, is in the form of a wastegate flap 4 with a flap plate 5. The exhaust-gas control device 4 is actuated by means of an actuator 12. For this purpose, the actuator 12, which as explained above is in the form of a pneumatic control capsule in the embodiment as per FIG. 1, is connected to the exhaust-gas control device 4 via a drive train 6. In the embodiment illustrated in FIG. 1, the drive train 6 has a regulating rod 7 which can be adjusted in a translatory movement by means of the actuator 12. At its free end, the regulating rod 7 is connected via a connecting piece 20 to an external drive lever 13. The drive lever 13 is connected to a flap shaft 18 to which there is attached an internal flap shaft lever 19 to which the flap plate 5 is fastened. In the illustrated example of FIG. 1, the drive train 6 accordingly has the regulating rod 7, the connecting piece 20, the external drive lever 13, the flap shaft 18 and the internal flap shaft lever 19, via which parts the actuator 12 is connected to the wastegate flap or the flap plate 5 thereof.

According to the invention, at least one damping connecting element, which is symbolized by the block 8 in the regulating rod 7, is arranged in the drive train 6. Also illustrated by way of example is a further damping element $8^{III}$ which is arranged in a receiving recess 14 of the drive lever 13.

In principle, it is possible according to the invention for only a single damping element 8 to be arranged in the drive train 6, wherein the position of the damping element 8 within the drive train 6 can be selected freely in accordance with the construction.

Furthermore, the present invention also encompasses the arrangement of multiple damping elements 8 or $8^{III}$ or other types of damping elements, which are not illustrated in detail in FIG. 1, in the drive train 6 should this be necessary owing to the construction of the exhaust-gas turbocharger 1 or the conditions under which it is used.

Figure 2:
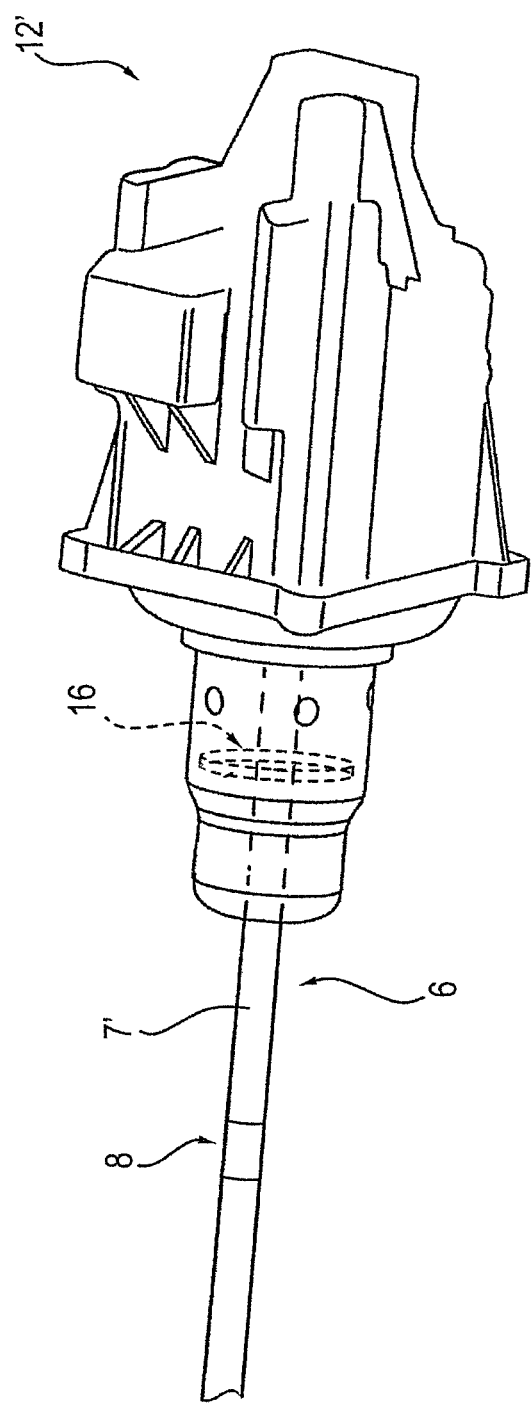
FIG. 2 is a perspective illustration of an alternative actuator in the form of an electric actuator with which the exhaust-gas turbocharger can be provided instead of the pneumatic control capsule shown in FIG. 1.

As an alternative to the actuator 12 (control capsule) of the embodiment as per FIG. 1, FIG. 2 illustrates an actuator 12' in the form of a so-called "electric actuator". The electric actuator 12' can replace the control capsule 12 of the embodiment as per FIG. 1. The actuator 12' also has a drive train 6 which, in FIG. 2, is represented only by the regulating rod 7 and a drive pinion 16. The drive pinion 16 is arranged in the electric actuator 12' and may be provided with a suitable damping element $8^V$. In the embodiment illustrated in FIG. 2, a damping element is also arranged in the regulating rod 7, the damping element likewise being indicated symbolically by the block 8 as a representative for further conceivable damping elements. It is also possible in this embodiment for only one of the damping elements to be provided or for multiple such damping elements to be provided at suitable locations in the drive train 6 between the electric actuator 12' and the exhaust-gas control device 4.

Figure 5:
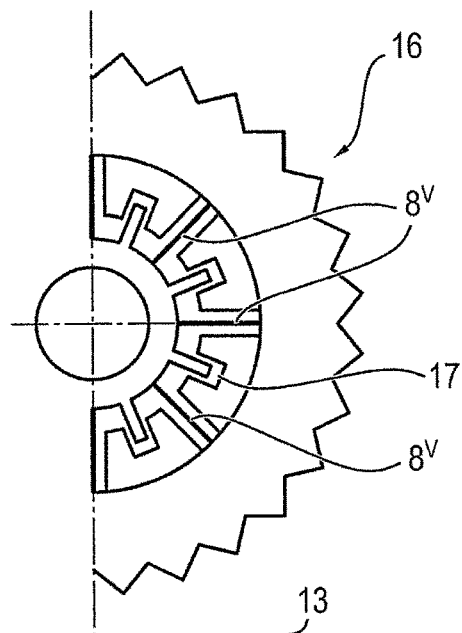
FIG. 5 is a schematically simplified illustration of a drive pinion of the electric actuator as per FIG. 2.

It is clear from the illustration of the drive pinion 16 in FIG. 5 that it is also possible for a multiplicity of damping elements $8^V$ to be arranged in the drive pinion 16. FIG. 5 also shows that the drive pinion 16 is provided with a multiplicity of stops for torsion limitation, one of which stops is denoted, as a representative for all of the stops, by the reference numeral 17.

Figure 3:
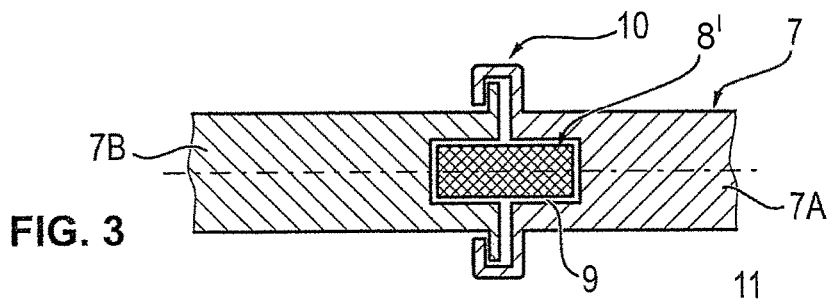
FIG. 3 is a schematically greatly simplified partial illustration of a coupling rod of the drive train of the exhaust-gas turbocharger according to the invention.

FIG. 3 shows an embodiment of the coupling rod 7 which has two coupling rod sections 7A and 7B, which can be connected to one another via a connecting device 10. The coupling rod 7 as per FIG. 3 has a receiving recess 9 which extends into both rod sections 7A and 7B and which receives a damping element $8^I$ that can be subjected to pressure loading. As can be seen from FIG. 3, the damping element $8^I$ is, in the example, a damping block that is constructed preferably from elastomer material.

Figure 4A:
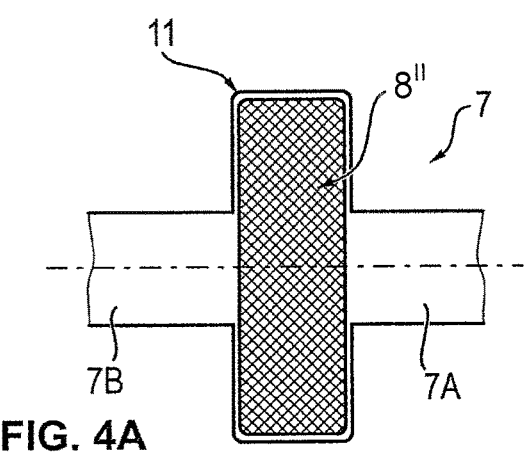
FIGS. 4A to 4D are simplified illustrations of the coupling rod of the drive train of the exhaust-gas turbocharger according to the invention, with an alternative embodiment of a damping element.
Figure 4B:
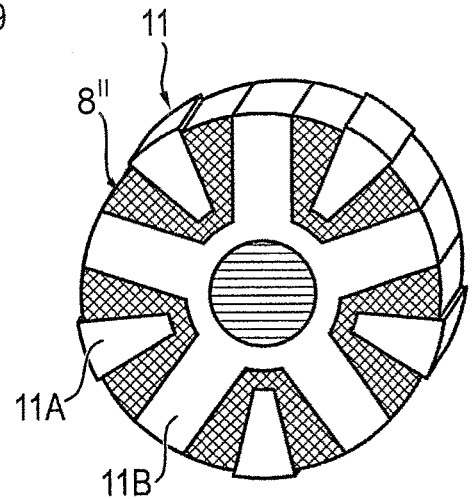
Figure 4C:
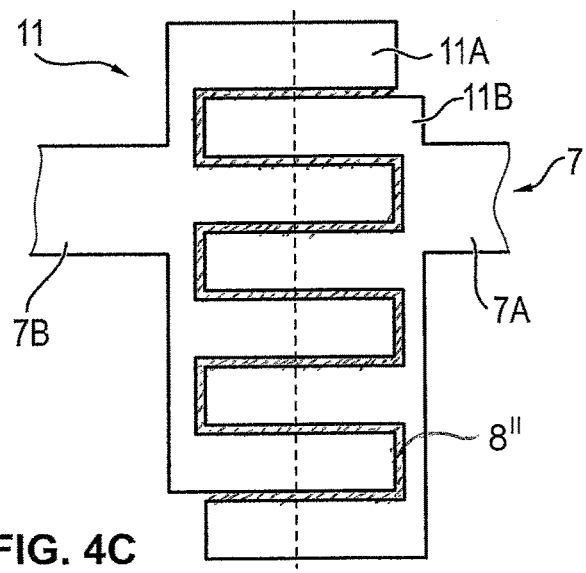
Figure 4D:
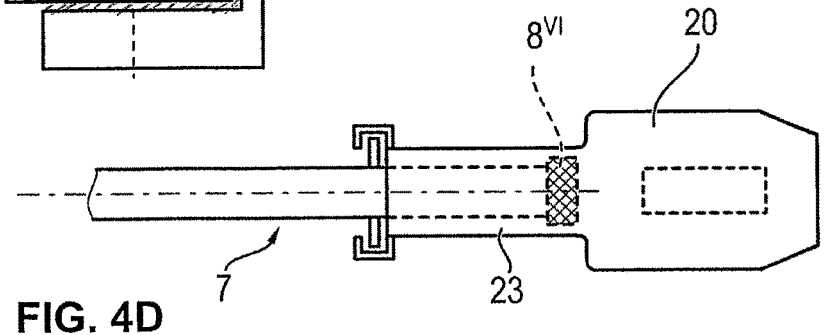

FIGS. 4A to 4C likewise show an embodiment in which the coupling rod 7 has two coupling rod sections 7A and 7B. The coupling rod sections 7A and 7B are connected to one another via a cage 11 which has turned-over lobes 11A and 11B. In the example, the lobes 11A are integrally formed on the coupling rod section 7B, whereas the lobes 11B are arranged on the coupling rod section 7A. Here, FIG. 4C shows how the lobes 11A and 11B engage into one another. Furthermore, FIGS. 4A and 4B show that a damping element $8^{II}$ is installed in the cage 11, which damping element provides the required damping action and, in interaction with the lobes 11A and 11B, realizes the connection between the rod sections 7A and 7B. FIG. 4D shows a design variant in which the damping element $8^{VI}$ is arranged between the coupling rod end 23 and the connecting piece 20.

Figure 6A:
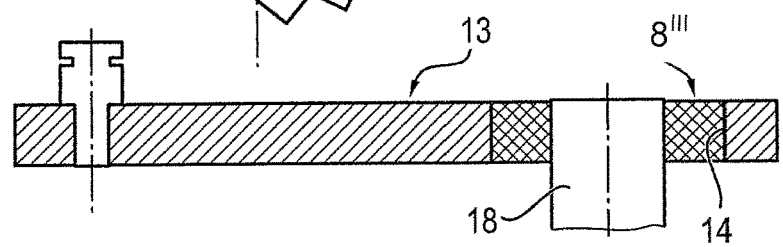
FIGS. 6A and 6B show a side view and a plan view of a drive lever of the drive train of the exhaust-gas turbocharger according to the invention.
Figure 6B:
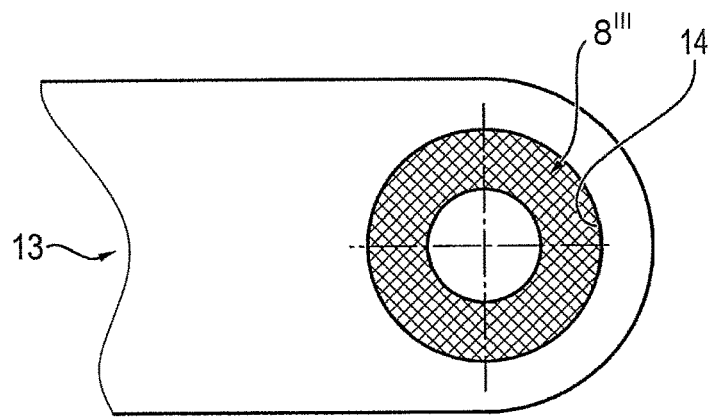

FIGS. 6A and 6B show the drive lever 13, already described on the basis of FIG. 1, as a further element of the drive train 6. In the embodiment as per FIGS. 6A and 6B, the drive lever 13 has a receiving recess 14 in its free end region, as has likewise already been explained on the basis of FIG. 1, into which receiving recess there is installed a damping element $8^{III}$ which can be subjected to radial loading and which is likewise preferably composed of elastomer material. One end of the flap shaft 18 can be inserted into the damping element $8^{III}$.

Figure 7:
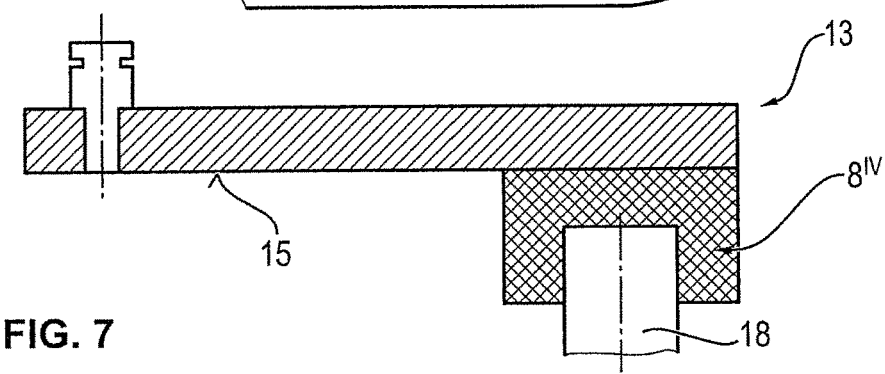
FIG. 7 is an illustration, corresponding to FIG. 6A, of an alternative embodiment of the drive lever.

FIG. 7 shows the drive lever 13 again, in a further alternative embodiment. In this embodiment, a combined axially/radially acting damping element $8^{IV}$ is fastened to the underside 15 of the drive lever 13, into which damping element the flap shaft 18 engages as shown in detail in FIG. 7.

As already mentioned above, the damping elements as per the embodiments of FIGS. 1 to 7 are in the form of elastomer damping elements in the respectively described design variants.

In principle, however, it is also possible for gas-type or oil-type dampers to be provided in the drive train 6 in order to provide a damping action.

In each of the described embodiments, it is achieved that additional resonances can be avoided, that a lifetime-durable design of the exhaust-gas turbocharger can be attained, and that no additional energy is required here for the damping action.

In addition to the above written description of the invention, reference is hereby explicitly made, for additional disclosure thereof, to the diagrammatic illustration in FIGS. 1 to 7.

LIST OF REFERENCE SIGNS

1 Exhaust-gas turbocharger
2 Turbine
3 Turbine housing
4 Exhaust-gas control device (wastegate flap plate)
5 Flap plate
6 Drive train
7; 7' Coupling rod
7A, 7B Regulating rod sections
8 to $8^{VI}$ Damping element
9 Receiving recess
10 Connecting device
11 Cage
11A, 11B Lobes
12, 12' Actuator
13 Drive lever
14 Receiving recess
15 Underside
16 Drive pinion
17 Stops for torsion limitation
18 Flap shaft
19 Internal flap shaft lever
20 Connecting piece
21 Bearing housing
22 Compressor
23 Coupling rod end

The invention claimed is:
1. An exhaust-gas turbocharger (1) comprising:
a turbine (2) which has a turbine housing (3) and an exhaust-gas control device (4, 5) arranged in the turbine housing (2);
an actuator (12; 12'); and
a drive train operatively connecting the actuator (12; 12') to the exhaust-gas control device (4, 5);
wherein the drive train (6) has a coupling rod (7; 7') for longitudinal transmission of actuator force;
wherein at least one damping connection element (8; $8^I$; $8^{II}$; $8^{III}$; $8^{IV}$; $8^V$; $8^{VI}$) adapted to damp longitudinal transmitted gas pulsations in the drive train (6) between the exhaust-gas control device (4, 5) and the actuator (12; 12') is arranged in the coupling rod (7; 7'); and wherein the at least one damping connection element (8; $8^I$; $8^{II}$; $8^{III}$; $8^{IV}$; $8^V$; $8^{VI}$) is an elastomer component.

2. The exhaust-gas turbocharger as claimed in claim 1, wherein the at least one damping connection element ($8^I$) is arranged in the coupling rod (7; 7') and is subject to pressure loading when subjected to actuating force to damp gas pulsations in the drive train between the exhaust-gas control device and the actuator.

3. The exhaust-gas turbocharger as claimed in claim 1, wherein the at least one damping connection element ($8^{II}$) is arranged in the coupling rod (7; 7') and is subject to tension loading when subjected to actuating force to damp gas pulsations in the drive train between the exhaust-gas control device and the actuator.

4. The exhaust-gas turbocharger as claimed in claim 3, wherein the at least one damping connection element ($8^{II}$) is installed in a cage (11) with turned-over lobes (11A, 11B).

5. The exhaust-gas turbocharger as claimed in claim 1, wherein the drive train (6) has a drive lever (13) that is connected to the coupling rod (7; 7').

6. The exhaust-gas turbocharger as claimed in claim 5, wherein the at least one damping connection element is a radially acting damping connection element ($8^{III}$) arranged in a receiving recess (14) of the drive lever (13).

7. The exhaust-gas turbocharger as claimed in claim 5, wherein the at least one damping connection element is a combined axially and radially acting damping element ($8^{IV}$) arranged on an underside (15) of the drive lever (13).

8. The exhaust-gas turbocharger as claimed in claim 1, wherein the coupling rod (7) has a coupling rod end (23) on which a connecting piece (20) is arranged, wherein tire at least one damping connection element ($8^{VI}$) is arranged between (he coupling rod end (23) and the connecting piece (20).

9. An exhaust-gas turbocharger (1) comprising:
a turbine (2),
which has a turbine housing (3), and
which has an exhaust-gas control device (4, 5) arranged in the turbine housing (2); and
an actuator (12; 12') which is operatively connected to the exhaust-gas control device (4, 5) via a drive train (6);
wherein at least one damping connection element (8; $8^I$; $8^{II}$; $8^{III}$; $8^{IV}$; $8^V$; $8^{VI}$) is arranged in the drive train (6);
wherein the at least one damping connection element (8; $8^I$; $8^{II}$; $8^{III}$; $8^{IV}$; $8^V$; $8^{VI}$) is an elastomer component;
wherein the drive train (6) has a coupling rod (7; 7');
wherein the coupling rod (7) has a coupling rod end (23) on which a connecting piece (20) is arranged;
wherein the at least one damping connection element ($8^{VI}$) is arranged between the coupling rod end (23) and the connecting piece (20); and
wherein the actuator is an electric actuator (12') which has a drive pinion (16) provided with said at least one damping connection element ($8^V$).

* * * * *